July 28, 1953 W. P. BAMFORD ET AL 2,646,647
PROCESS AND APPARATUS FOR BENDING AND TEMPERING GLASS
Filed Sept. 10, 1948 8 Sheets-Sheet 1
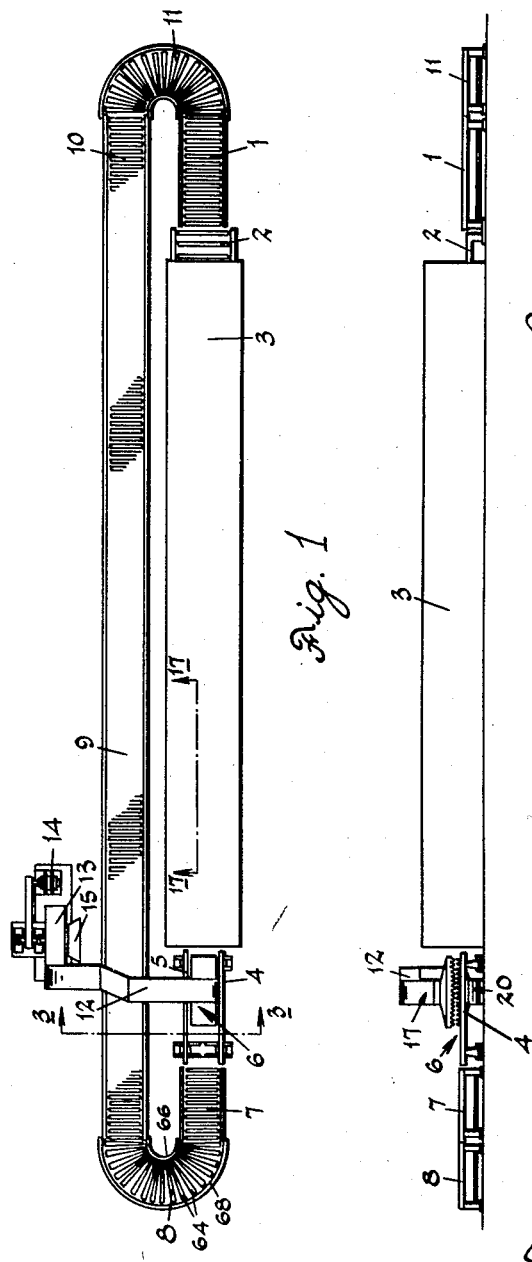

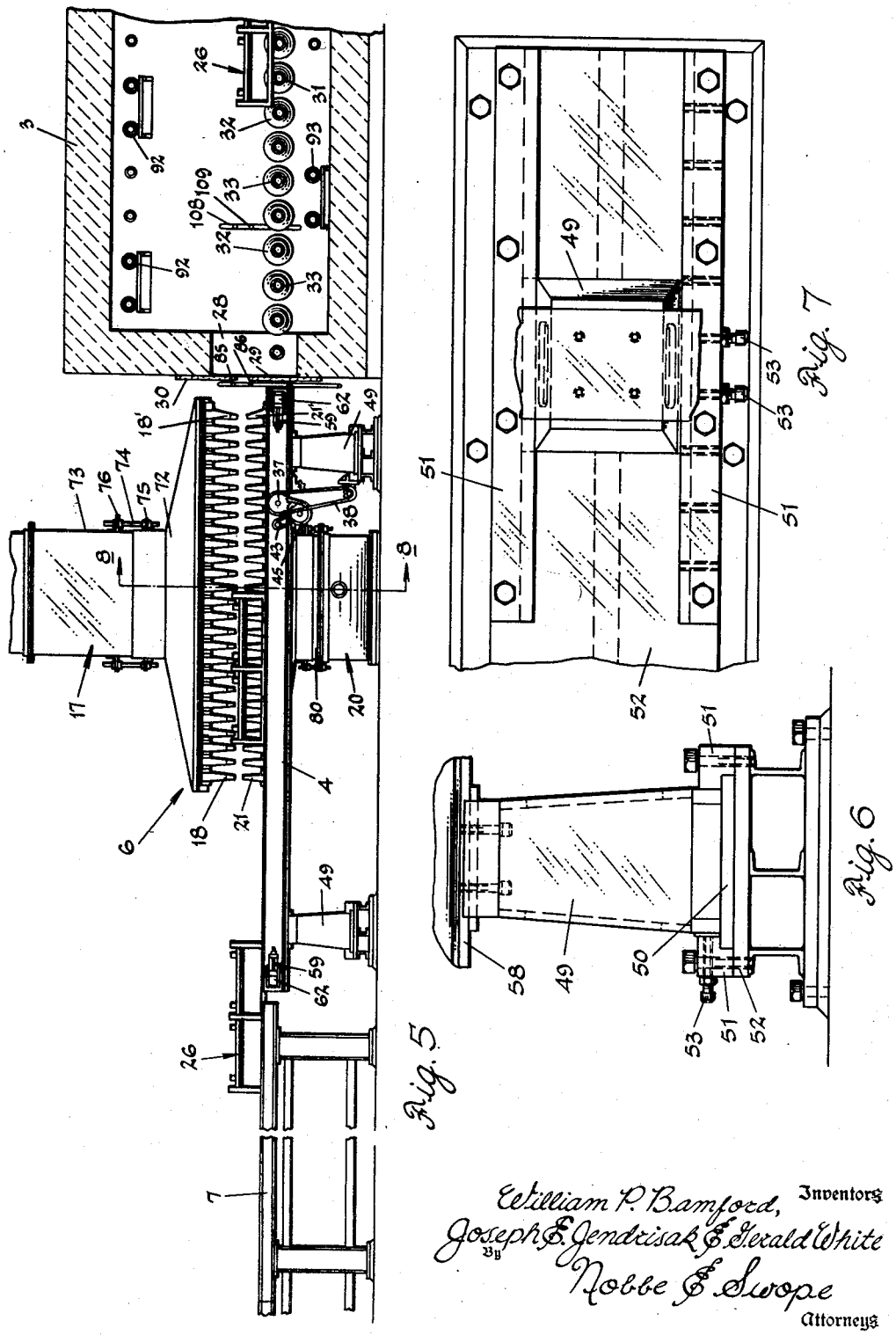

July 28, 1953 W. P. BAMFORD ET AL 2,646,647
PROCESS AND APPARATUS FOR BENDING AND TEMPERING GLASS
Filed Sept. 10, 1948 8 Sheets-Sheet 4

William P. Bamford,
Joseph E. Jendrisak & Gerald White Inventors
By Nobbe & Swope
Attorneys July 28, 1953   W. P. BAMFORD ET AL   2,646,647
PROCESS AND APPARATUS FOR BENDING AND TEMPERING GLASS
Filed Sept. 10, 1948   8 Sheets-Sheet 5
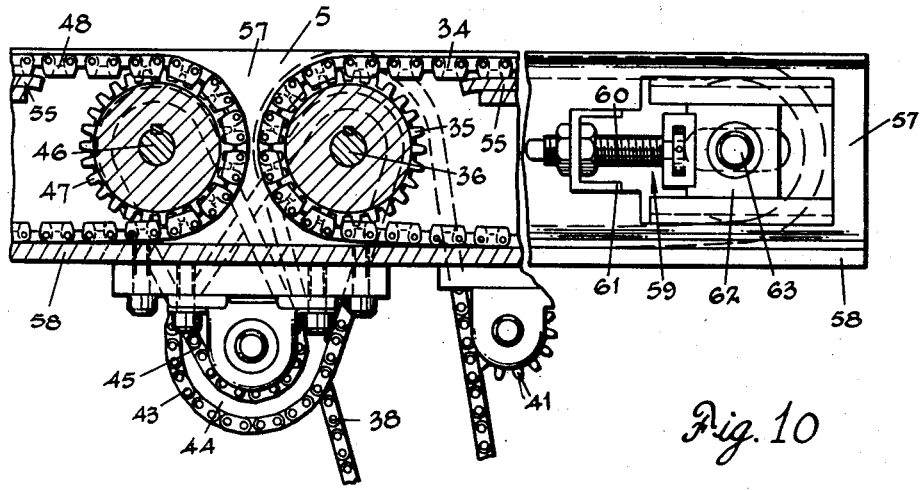
Fig. 10
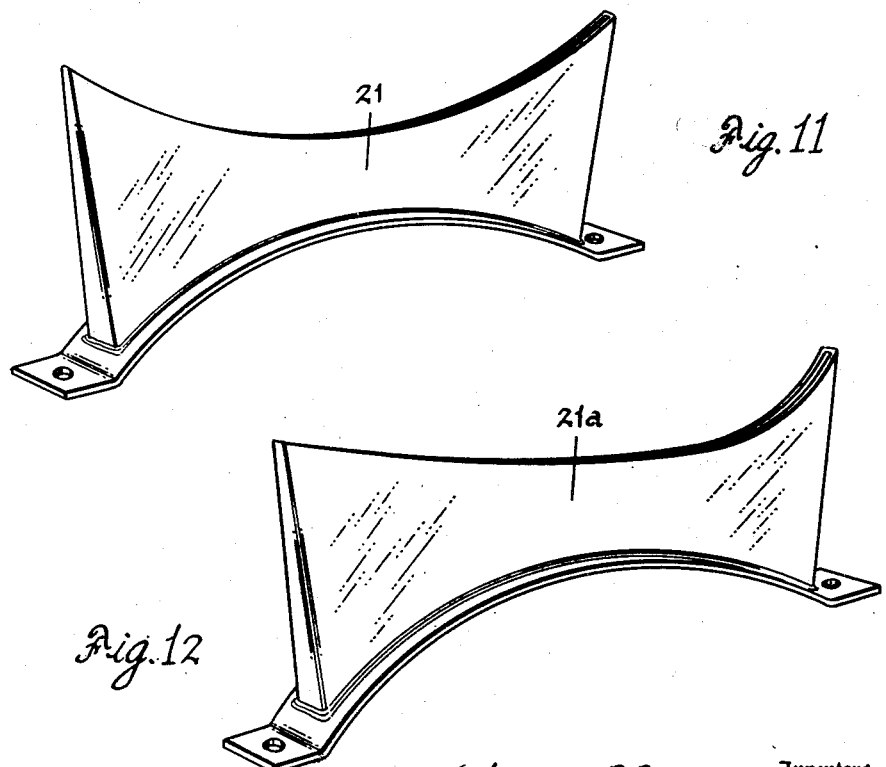
Fig. 11
Fig. 12
Inventors
William P. Bamford,
Joseph F. Jendrisak & Gerald White
By Nobbe & Swope
Attorneys July 28, 1953     W. P. BAMFORD ET AL     2,646,647
PROCESS AND APPARATUS FOR BENDING AND TEMPERING GLASS
Filed Sept. 10, 1948     8 Sheets-Sheet 6
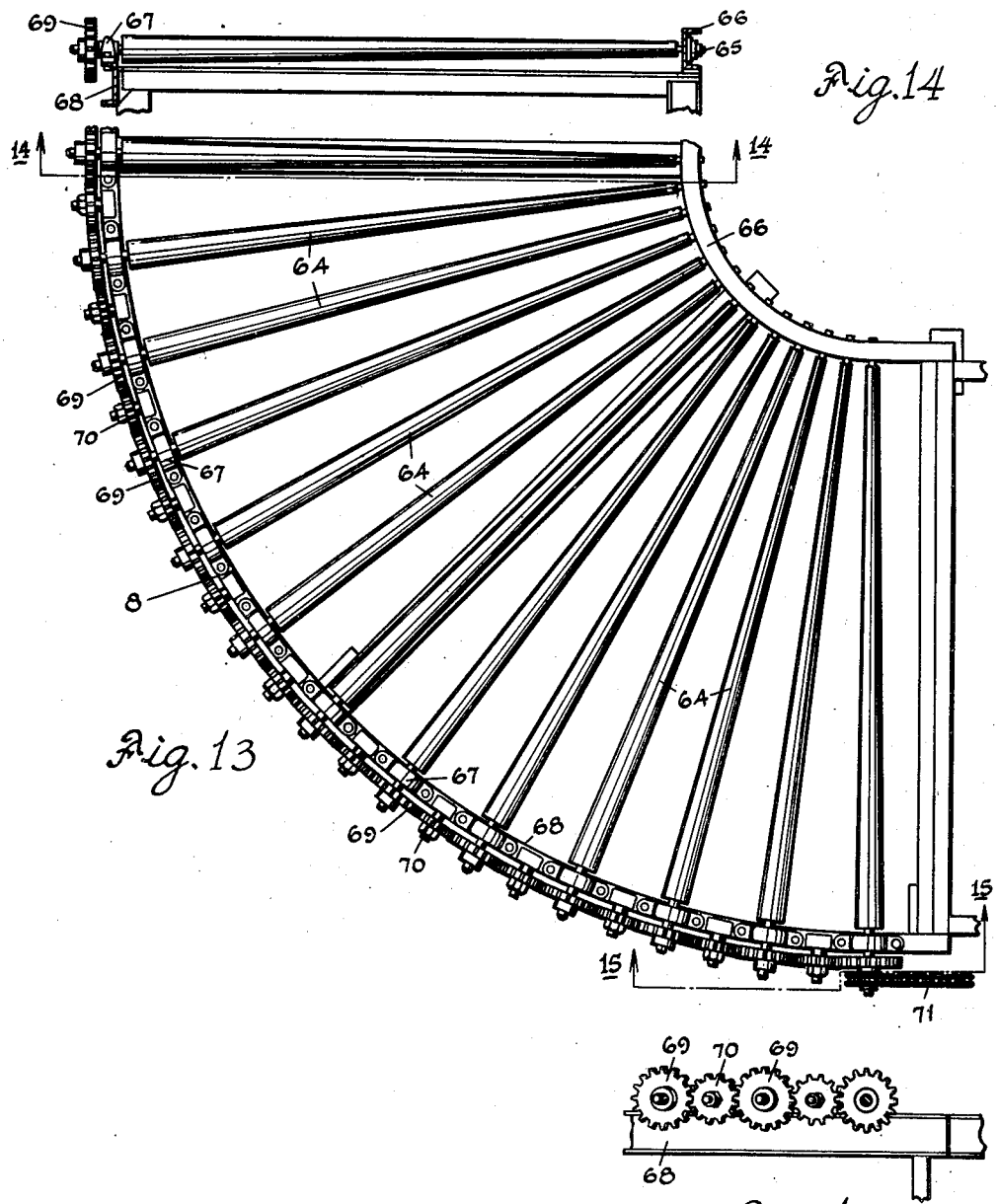
Inventors
William P. Bamford,
Joseph E. Jendrisak & Gerald White
By Nobbe & Swope
Attorneys

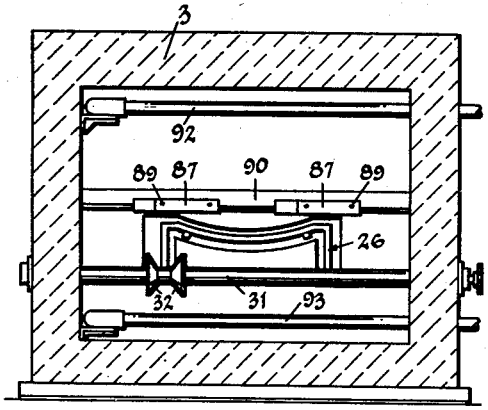
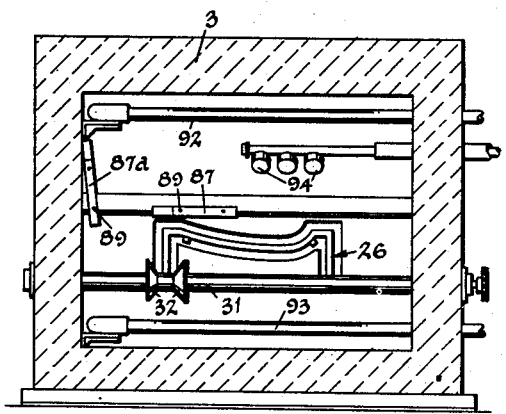
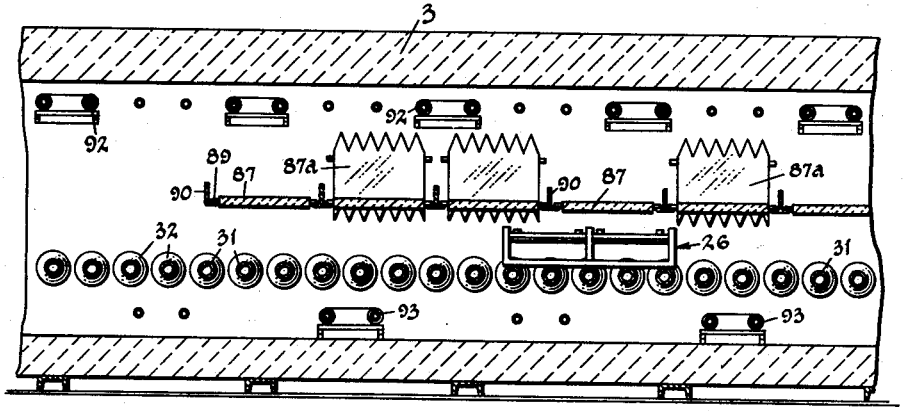
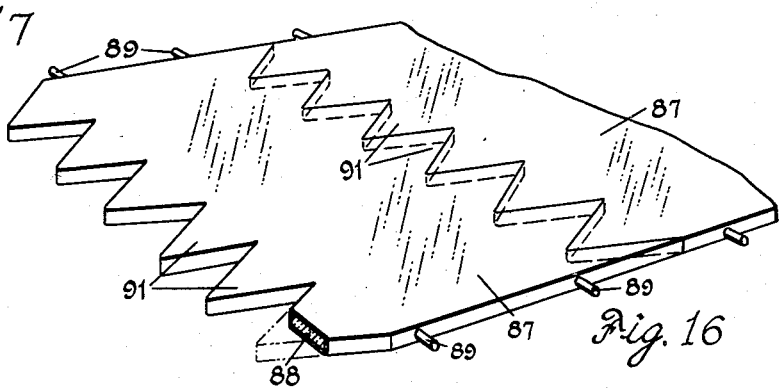

July 28, 1953 W. P. BAMFORD ET AL 2,646,647
PROCESS AND APPARATUS FOR BENDING AND TEMPERING GLASS
Filed Sept. 10, 1948 8 Sheets-Sheet 8

William P. Bamford, INVENTORS
Joseph E. Jendrisak & Gerald White
BY
Nobbe & Swope
ATTORNEYS

UNITED STATES PATENT OFFICE

2,646,647

PROCESS AND APPARATUS FOR BENDING AND TEMPERING GLASS

William P. Bamford, Maumee, and Joseph E. Jendrisak and Gerald White, Rossford, Ohio, assignors to Libbey-Owens-Ford Glass Company, Toledo, Ohio, a corporation of Ohio Application September 10, 1948, Serial No. 48,664

10 Claims. (Cl. 49—7)

This invention relates to glass bending and tempering equipment and in particular to improvements that facilitate the carrying out of these processes in a commercial manner.

It is relatively easy to bend glass when the size of the glass piece is small and when the shape to be formed is not complicated. However, difficulty is experienced when the sheets of glass to be bent are large and where the finished product must accurately conform to a predetermined shape. It is still more difficult if the glass sheets after bending must be tempered and after both processes must still conform accurately to a predetermined shape. Still more difficulties arise when the bent and tempered glass sheet must also pass stringent optical requirements as are imposed when the bent tempered glass is to be used as a window. Plate glass windows having practically no blemishes and having practically no distortion which interferes with clear vision through the windows are commonplace. Therefore, to be commercially acceptable the bent and tempered glass must satisfy substantially the same optical tests.

These stringent requirements make it necessary that the molds used in the bending of the glass have shaping surfaces that contact only the marginal area of the bent glass sheet; that no localized stress be set up in the glass (as by supporting it from clamps or other localized support); that the curves in the glass be produced without appreciable stretching or compression of the glass which would unevenly affect its thickness and thus introduce prism effects between adjacent areas of the glass; and, as a last requirement, that no support portion of the mold or any other structure contact the clear area of the glass while the glass is at an elevated temperature.

These stringent requirements make it extremely difficult to produce curved and tempered glass of required commercial quality according to the known methods of handling the glass.

The principal object of this invention is to provide glass bending and tempering equipment in which the glass to be bent is carried on a bending mold which, riding a conveyor, passes through a first region in which glass bending conditions are maintained and an immediately adjacent region in which glass tempering conditions are maintained.

Another object of the invention is to facilitate the bending of the glass by restricting heat applied to the glass to selected regions thereof.

Another object is the provision of a novel glass bending and tempering technique in which a glass sheet or plate to be treated is first heated non-uniformly to bend the same to a predetermined curvature, then additionally heated to cause the temperature of the entire area of the sheet to approach uniformity, and finally chilled substantially uniformly throughout its area to temper the bent sheet.

A still further object of the invention is to provide equipment for conveying the glass and mold at a substantially uniform speed through the heating region, then quickly transferring the mold to a tempering region, and subsequently conveying it at a reduced speed through the tempering region.

An ancillary object is to shape nozzles, through which the cooling fluid is directed toward the glass, to conform as nearly as possible to the shape of the bent glass sheet thereby minimizing the distance between the nozzles and a glass sheet moving between the nozzles.

Yet another object of the invention is to arrange a tempering system with a conveyor extending along each side of the tempering system so that molds carrying the bent glass sheets may straddle the lower portion of the tempering equipment while riding on the conveyors.

More specific objects and advantages are apparent from the description of glass bending and tempering equipment constructed according to the invention.

In carrying out a glass bending and tempering operation according to the invention, a glass sheet to be bent and tempered is supported on a mold in bending relation to a shaping surface thereof, the mold and glass are passed through a heating chamber during which passage the glass softens and conforms to the shaping surface of the mold, then the mold and glass are rapidly transferred from the discharge end of the heating chamber to a tempering region in which region sheets of cooling fluid are directed against the surfaces of the glass while the mold and glass are slowly moved through the region. It will be observed in this method of handling the glass that the glass is carried on the same mold throughout the entire processing operation and, since the bending is accomplished at least in part by gravity and the bent glass is supported in its marginal area only, that there is no step in the process tending to mar the surface of the glass.

A feature of the improved apparatus is the construction and arrangement of a plenum chamber and nozzles for directing cooling fluid against the lower surface of the glass while the glass is carried on a mold that straddles the plenum chamber and that rides on conveyors extending along the sides of the chamber. It is this arrangement that permits the same mold to carry a glass sheet through both a bending region and a tempering region.

Another feature of the invention relating to the bending portion of the process is the use of heat deflectors to shield selected portions of the glass from the action of radiant heaters used as heat sources within the heating chamber. The heat deflector may be either carried on the mold so that it travels with the glass or it may be mounted in a frame or rack within the heating chamber so as to shield selected portions of the path of the glass.

These and other features of the invention are set forth in the following description of equipment for carrying out the invention, which equipment is illustrated in the accompanying drawings.

In the drawings:

Figure 1 is a plan view of the equipment showing the general arrangement of the various portions thereof.

Figure 2 is a front elevation of the improved equipment.

Figure 3 is an end elevation of the cooling or tempering system as seen from the line 3—3 of Figure 1.

Figure 4 is a perspective view of a mold frame suitable for use in the improved equipment.

Figure 5 is an enlarged front elevation, with parts shown in section, of the discharge end of the heating chamber and the cooling system.

Figure 6 is a greatly enlarged detail elevation of one of the pedestals used to support the conveyor that carries the molds through the cooling station.

Figure 7 is a plan view of the pedestal and its foundation.

Figure 10 is a fragmentary detail view, partly in section, showing a portion of the conveyor drive as seen from the line 10—10 of Figure 8.

Figures 11 and 12 are perspective views of nozzles that are used for directing cooling fluid against the heated glass.

Figure 13 is a plan view of one corner of the conveyor system that is employed to carry the molds from a loading station through the heating chamber and tempering station and back to an unloading station that is adjacent the loading station.

Figure 14 is a vertical section taken along the line 14—14 of Figure 13.

Figure 15 is a fragmentary elevation of the gears that drive the conveyor rollers shown in Figure 13, the elevation being taken along the line 15—15 of Figure 13.

Figure 16 is a perspective view of a pair of heat deflectors that are used in the heating chamber to shield selected areas of the path of the glass being bent.

Figure 17 is a vertical section through a portion of the heating chamber in the region indicated by the line 17—17 of Figure 1.

Figures 18 and 19 are transverse vertical sections of the portion of the heating chamber shown in Figure 17 to show the mounting for and the use of the heat deflectors shown in Figure 16.

Figure 8:
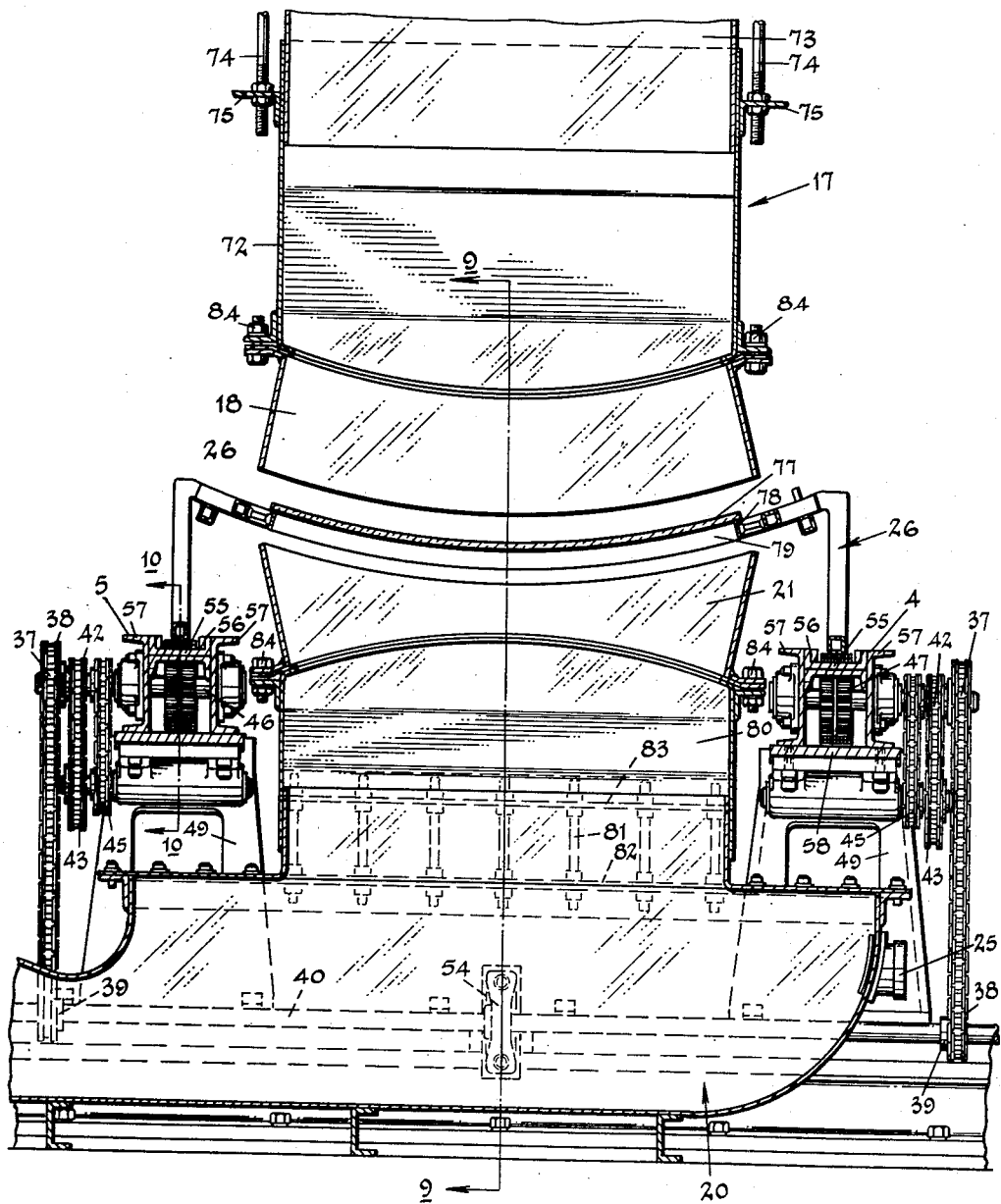
Figure 8 is a greatly enlarged, vertical, transverse section of the working end of the cooling system as seen from the line 8—8 of Figure 5.

These specific figures and the accompanying description are intended merely to illustrate the invention but not to impose limitations on the claims.

Referring now to Figure 1, molds carrying glass sheets to be bent are started along a conveyor section 1 that constitutes a loading station and that carries the molds to a power driven roller conveyor 2 at the inlet end of a heating chamber or furnace 3. The power driven roller conveyor 2 extends throughout the length of the heating chamber 3. At the discharge end of the heating chamber 3 the molds are carried on narrow chain conveyors 4 and 5, which passing along the sides of a quenching station 6, permit the mold to straddle the lower portion of the quenching system. From the chain conveyors 4 and 5 the molds are transferred to another conveyor section 7 leading to a semicircular conveyor section 8 which reverses the direction of travel of the molds and leads them to a return conveyor 9 extending alongside the heating chamber 3 and terminating at an unloading station 10. The bent glass sheets, which have now cooled to a temperature at which they may be handled, are removed from the molds at the unloading station 10 and the molds are then carried on a semicircular conveyor 11 to the loading station at the start of the conveyor 1. Since all of the conveyor sections operate in the same horizontal plane, it is necessary that they all be power driven in order to secure an uninterrupted movement of the molds.

The quenching system 6 employs air as a cooling fluid. This air is supplied under pressure through a duct 12 leading from a centrifugal fan or blower 13 which is belt driven from an electric motor 14. The fan 13 draws the air, from the room or from outside the building, in through its intake 15 mounted on the side of the housing of the fan 13.

Referring now to Figure 3, the air that is drawn through the fan 13 is carried upwardly and then horizontally through the duct 12 and an upper branch duct 16 leading to a plenum chamber 17 forming the upper portion of the quenching system 6. The plenum chamber 17 terminates in a series of nozzles 18 the discharge orifices of which are located immediately above the path of the glass sheets to be tempered.

The air supply duct 12 also has another or lower branch duct 19 which leads to a lower plenum chamber 20 that is fitted with nozzles 21 located immediately beneath the path of the glass sheets to be tempered. A damper 22 controlled by a handle 23 regulates the flow of cooling fluid through the lower branch duct 19 so as to maintain the desired pressure relations between the upper and lower plenum chambers 17 and 20 respectively. Pressure gauges 24 and 25 are provided to give a visual indication of the pressures within these chambers.

As may be seen in Figure 3, the orifice ends of the nozzles 18 are convex downwardly while the orifice ends of the lower nozzles 21 are concave so that, in end elevation, a clear space is left between the nozzles 18 and 21 which clear space conforms generally to the curvature of a bent glass sheet. A mold frame 26 (Figure 4) has its cross members 27 curved to conform to the same curvature as the bent glass sheet so that it may carry the glass supporting mold and the glass through the space between the nozzles 18 and 21 with the nozzles located equally close to all portions of the glass sheet to be cooled. As is illustrated in Figures 11 and 12, the orifice ends of the nozzles 18 and 21 may be varied by design to conform to any desired glass curvature.

The molds emerge from the heating chamber 3 through an exit opening 28 which is partially closed by baffle plates 29 and 30 (Figure 9) to leave a clear exit space that conforms to the end elevation of the mold frame 26 and glass and mold carried thereon. The restriction of the exit opening 28 serves two purposes. First, it decreases the heat loss at the end of the heating chamber which would upset the temperature relations at that point and, second, the baffles shield the area adjacent the tempering and cooling system 6 to provide more comfortable working space for the workmen who supervise the operation of the equipment.

In Figures 1 and 3 a single fan is shown for supplying air through the duct 12 and the upper and lower branch ducts 16 and 19 leading to the plenum chambers 17 and 20 and nozzles 18 and 21. In some instances, it may be desirable to use one fan to supply the branch duct 16 and a second fan to supply the branch duct 19. This may provide a more flexible control in that the pressures may be varied both ways from the normal condition.

Referring now to Figures 5, 8 and 10, the mold frames 26 progress through the heating chamber 3 on the roller conveyor 2 which consists of a large number of tubular conveyor rollers 31 which are spaced at intervals and driven by power mechanism extending along the side of the chamber 3. Each of the tubular conveyor rollers 31 is fitted with a pair of conical collars 32 which collars define a track for one of the legs of the mold frame 26 for guiding the mold frames along their intended path.

At the discharge end of the heating chamber 3 the conveyor 2 includes a few rollers 33 which are similar to the rollers 31 except that they are driven at a considerably higher speed. These high speed rollers accelerate the mold frames to quickly transfer the mold frames and glass from the heating chamber 3 through the opening 28 and onto the conveyors 4 and 5 that carry them into the space between the cooling nozzles 18 and 21.

The conveyors 4 and 5 each consist of a first conveyor chain 34 (Figure 10) which is driven by a sprocket 35 mounted on a short cross shaft 36. The shaft 36 at its outer end carries a sprocket 37 over which a drive chain 38 is trained. The drive chain 38 is driven from a drive sprocket 39 carried on a transverse power shaft 40 while its tension is controlled by an idler pinion 41 mounted beneath the conveyor section 5.

A second sprocket 42 mounted on the transverse shaft 36 carries a second drive chain 43 serving to drive a large sprocket 44 which is positively connected to a smaller sprocket carrying a third drive chain 45. The third drive chain 45 drives a second transverse shaft 46 carrying a sprocket 47 that receives and drives a second conveyor chain 48. The sprockets carrying the second and third drive chains 43 and 45 effect a speed reduction such that the second coneveyor chain 48 operates much slower than the first conveyor chain 34. From Figure 5 it will be noticed that the first conveyor chain 34 extends past approximately one-fourth of the nozzles 18 or 21 and that the second or slow speed conveyor chain 48 extends past and beyond the remaining nozzles.

This arrangement makes it possible for a mold frame 26 to be carried at substantially uniform speed through the heating chamber 3, then moved rapidly from the heating chamber 3 as it engages the higher speed rollers 33 which carry it out of the heating chamber 3 and onto the conveyor chains 34. These chains, operated at substantially the velocity imparted to the mold frame 26 by the rollers 33, carry the mold frame into the space between the nozzles 18 and 21. The mold frame then engages the slow speed conveyor chain 48 so that it continues its motion at a lower rate of speed past the remaining ones of the nozzles 18 and 21 and is then carried forward until it is finally transferred to the conveyor 7.

The mold frames 26 may be varied in width according to the size of the mold and the glass that is to be bent. Since only one side of the mold frames are guided by the conical collars 32, the width of the frames does not affect the operation on the conveyor 2. However, the conveyors 4 and 5 each of which includes a high speed conveyor chain 34 and a slow speed conveyor chain 48 are narrow and must, therefore, be spaced apart a distance equal to the width of the mold frames 26. This spacing is made adjustable by mounting each of the conveyors 4 and 5 on pedestals 49 each of which is provided with a flanged foot 50, the flanges of which engage transverse ways 51 serving to hold the flanged foot 50 against the upper surface of a foundation frame 52 extending transversely of the conveyor. The spacing between the chain conveyors 4 and 5 is adjusted by loosening clamping bolts 53 and sliding the conveyor pedestals 49 along the ways 51 until the desired spacing is reached and then clamping the pedestals in position by tightening the bolts 53.

The drive shaft 40 extends along one of the ways 51 and the sprockets 39 attached thereto are slidable along the drive shaft 40 so that the conveyors may be driven by the same drive mechanism regardless of their spacing. The drive shaft 40 is supported intermediately of the sprockets 39 by a center bearing 54.

Referring now more particularly to Figures 8 and 10, the conveyor chains 34 and 48 during travel along their upper flight ride on webs 55 of channel irons 56 comprising the upper part of the frames of the conveyors 4 and 5. The channel irons 56 are rigidly secured between side channel irons 57 which together with a base plate 58 form a box-like frame for the conveyor. The return or lower flights of the conveyor chains 34 and 48 run on the base plate 58. In this arrangement the upper channel irons 56 form a support for the upper flight of the conveyor chains and serve as side guards for preventing the mold frames 26 from departing from their intended path.

The conveyor chains 34 and 48 are kept under proper tension by take-up mechanisms 59 each comprising a screw 60 which is locked in position by adjusting nuts engaging the sides of a bracket 61. The adjusting screws 60 serve to adjust bearing blocks 62 along the side channel irons 57 and thus vary the distance between the drive shafts 36, 46 and shafts 63 journaled in the blocks 62 and carrying sprockets over which the conveyor chains 34 and 48 run.

Referring now to Figure 13 which shows a portion of the semicircular conveyor 8, this conveyor comprises a plurality of conical rollers 64 the small ends of which are journaled in bearings 65 mounted in a semicircular frame member 66 at the inner side of the curve of the conveyor. The large diameter ends of the rollers 64 are journaled in bearings 67 supported from a frame member 68 that is substantially concentric with the first semicircular frame member 66. Gears 69 mounted on the outer ends of the shafts of the conical rollers 64 are interconnected by idler gears 70 so that power delivered through a chain 71 to the first of the tapered rollers 64 is transmitted through the gears to drive all of the tapered rollers in unison. The axes of the tapered rollers 64 are arranged to meet at a point at the center of curvature of the frame members 66 and 68 and are arranged to slope upwardly toward the small ends so that the conveyor surface formed by a plane tangent to the upper surfaces of the rollers 64 is horizontal. This arrangement provides a simple mechanism for transferring the mold frames from the conveyor coming from the heating and tempering zones to the return conveyor 9 extending back alongside the heating chamber 3.

Figure 9:
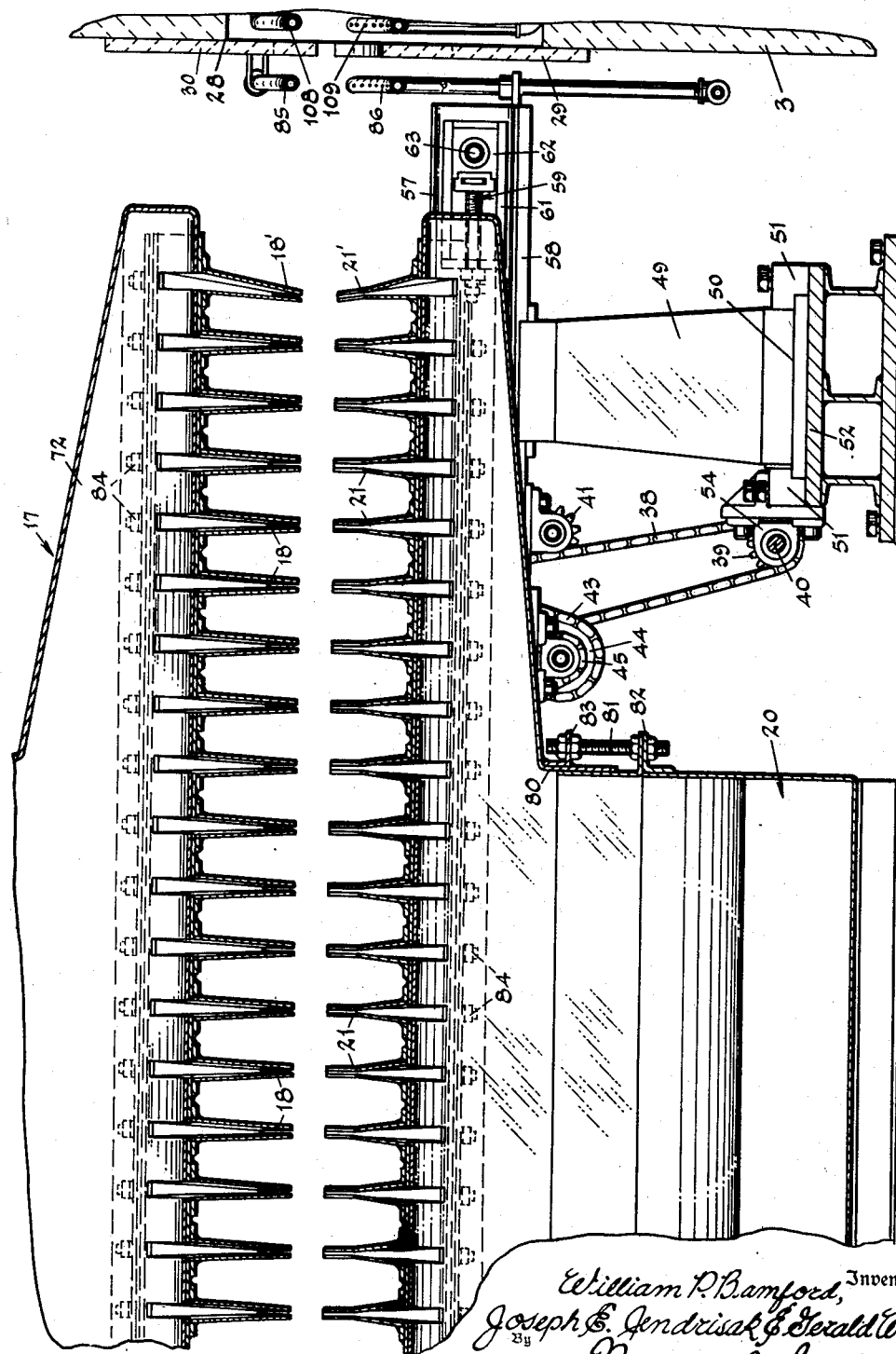
Figure 9 is a greatly enlarged vertical longitudinal section of the working end of the cooling system as seen from the line 9—9 of Figure 8.

Referring now to Figures 8 and 9, the upper plenum chamber 17 comprises telescoping sections 72 and 73 the telescoping engagement of which is regulated by a plurality of bolts 74 that engage flanges 75 and 76 attached to the lower and upper sections 72 and 73 respectively. The telescoping engagement between the plenum chamber sections 72 and 73 is used to regulate the distance between the nozzles 18 attached to the lower side of the section 72 and the upper surface of a glass sheet 77 that rests on a shaping surface 78 of a mold 79 carried on the mold frame 26.

The lower plenum chamber 20 includes a telescoping section 80 the height of which is regulated by a plurality of bolts 81 that engage flanges 82 and 83 of the stationary part of the plenum chamber 20 and the telescoping section 80. The telescoping of the section 80 over the stationary portion of the lower plenum chamber 20 is used to regulate the distance between the orifice side of the nozzles 21 and the path of the mold frames 26.

The lower surface of the telescoping portion 72 of the upper plenum chamber 17 and the upper surface of the telescoping section 80 of the lower plenum chamber 20 are convex toward each other and each is open toward the other, i. e., toward the path of the glass to be cooled. The nozzles 18 and 21 extend across the openings of the plenum chamber to which they are attached as by means of bolts 84 and the plurality of nozzles collectively cover the entire area of the openings in the plenum chambers.

From Figure 8 it may be noticed that the orifice side of each of the nozzles is shaped to conform generally to the contour of the bent glass sheet 77. In Figure 9 it will be noticed that the nozzles 18 and 21 are arranged to direct the cooling fluid along a path that is normal to the surface of the glass being treated.

At the discharge end of the heating chamber 3 the mold frames 26 carrying the molds and bent glass pass through the opening between the baffle plates 29 and 30 and then travel forward until the molds and glass are completely past the first of the nozzles 18 and 21. The first of the nozzles 18 and 21, the nozzles 18' and 21', are inclined in the direction of movement of the glass to cause the cooling fluid to flow toward the other nozzles when it strikes the surface of the glass rather than back toward the heating chamber 3. Likewise, as much clear space as possible is left for the escape of the cooling fluid toward the sides of the conveyors 4 and 5 to minimize the draft or circulation of cool air toward the exit of the heating chamber 3. If the cooling fluid from the nozzles 18 and 21 were directed toward the opening between the baffle plates 29 and 30 it would seriously upset the temperature conditions within the heating chamber 3.

It is practically impossible to completely eliminate the flow of cool air toward the heating chamber. Therefore, gas burners 85 and 86 directed toward the opening between the baffle plates 29 and 30 are employed to establish a high temperature region at the exit opening and a flame curtain which shields the interior of the heating chamber 3 from cold drafts from the cooling and tempering system including the nozzles 18 and 21.

As the glass is carried on the mold past the nozzles 18 and 21 the cool air, consituting a cooling fluid, impinging on its surfaces causes cooling and contraction of the surface of the glass prior to the cooling of the interior of the glass sheet. This rapid surface cooling, known as quenching, causes contraction of the surface of the glass while the interior of the glass sheet is still sufficiently plastic to accommodate the shrinkage of the surface layers. The subsequent cooling and contraction of the interior of the glass sheet sets up internal stresses within the glass with the interior of the glass under tension and the surface layers under compression in directions parallel to the surface of the glass. The production of these internal stresses in the glass, known as tempering, produces a glass sheet that is unusually strong in resisting transverse loading. This follows because glass is very strong in compression but relatively weak in tension. Therefore, when a transverse load is applied to tempered glass, the surface next to the load suffers additional compression while the surface remote from the load suffers a reduction in the compressive force which, for ordinary loads, is not sufficient to cancel the initial compressive stress so that both surfaces of the glass remain under compression. Since any fracture must start in the surface of the glass and since glass usually fails in tension, it follows that a tempered glass sheet must be stressed much higher than an ordinary glass sheet before fracture occurs.

It is important when quenching glass, particularly by the sweep quenching method resulting from the operation of the long thin orifices of the nozzles 18 and 21, that the cooling fluid shall be uniformly distributed and never allowed to concentrate on any particular area for an appreciable length of time. If non-uniform cooling occurs the glass may be weaker and have an undesirable breaking pattern. In the present equipment this condition does not occur because the mold never stops during its passage past the nozzles 18 and 21. The conveyors are arranged to rapidly move the mold and mold frame from the heating chamber into the space between the nozzles and then without bringing it to a stop to merely reduce its speed and slowly carry it the remaining distance through the tempering zone. Since the nozzles extend the full width of the glass sheet with a slight excess at each side, each of the nozzles provides a fan shaped stream of cooling fluid that extends uniformly across the full width of the glass sheet. After striking the glass the spent cooling fluid moves away from the glass into the space between the nozzles and flows toward the sides and out over the conveyors 4 and 5.

Figures 11 and 12 show the general shape of the nozzles that are suitable for use in the quenching of glass. The nozzle 21 shown in Figure 11 is substantially the shape used on the lower plenum chamber while the nozzle 21a (Figure 12) shows a modified form in which the shape of the glass instead of being symmetrically curved has the curvature confined largely to one end of the sheet of glass.

Referring now to Figures 16 to 21 inclusive and in particular Figure 16, it is sometimes found desirable to shield selected portions of the glass sheet during its travel through the heating chamber. This shielding of portions of the glass permits portions of the glass sheet to be brought to bending temperature without raising other portions of the glass to such temperatures. This selective heating provides more control of the bending conditions so that those portions of the glass that are to be left flat do not sag out of shape while relatively deep bends are made in other portions of the sheet. The selective heating may be accomplished by either supplying localized heat to that portion of the glass to be bent or by providing a general source of heat and shading or shielding those portions which are not to be bent. The latter method is preferable because of its simplicity. The required apparatus consists merely of one or more heat deflectors 87 (Figure 16) that are formed of stainless steel sheets or skins formed over a heat insulating core 88. These heat deflectors 87 are interposed between the path of the glass sheets being processed and the sources of heat located within the heating chamber 3.

For convenience in mounting, each of the heat deflectors 87 may be provided at each of its ends with pins 89 which may rest on horizontal flanges of T-bars 90 mounted crosswise within the heating chamber 3 and clear of the bath of the mold frames 26 to form a rack. Since the heat deflectors 87 are slidably carried on the T-bars 90, they may be easily moved to whatever location is required to properly concentrate the heat on the glass.

Since the heat deflectors are relatively close to the glass and since sharp changes in temperature between adjacent portions of the glass should be avoided the edges of the deflectors 87 that are parallel to the path of movement of the glass are serrated forming generally triangular teeth 91 which widen the zone between the completely shaded and the completely exposed areas of the glass thus minimizing the abruptness of the temperature differential between the adjacent portions. The teeth 91 are symmetrically located along both edges of the deflectors 87 so that in the event a larger width must be shaded two or more of the deflectors may be pushed together with the teeth of one meshing with the teeth of another.

In the event that all of the heat deflectors installed in the heating chamber 3 are not required, the idle deflectors may be pushed against the side of the heating chamber 3 and stood on edge as shown by the deflector 87a of Figures 17 and 19.

The heating chamber 3 is heated by a plurality of burner tubes 92 located adjacent the ceiling of the heating chamber and a relatively lesser number of burner tubes 93 located beneath the conveyor and above the floor of the chamber. The burner tubes 92 and 93 are gas fired and a fair portion of the developed heat is in the form of radiant energy directed toward the glass. The heat deflectors 87 may be interposed between the heaters 92 and the glass to intercept the radiant heat energy so that the shaded portions of the glass are heated by the heated atmosphere only. Thus in producing the shape of bend shown in Figure 18 the heat deflectors 87 are located over the ends of the glass sheet so that the middle thereof receives the greatest amount of heat. This arrangement is suitable when the curvature of the glass is confined largely to its center section.

Figure 19 shows an arrangement in which the bend is confined largely to one end of the sheet glass and in this case the heat deflectors 87 are pushed away from the deeply bent portion of the glass so as to shield the relatively flat end section. In this case, one of the deflectors of the pair is not used and is stood up against one side of the chamber 3 in the position occupied by the deflector 87a. Figure 19 also illustrates the use of auxiliary radiant heaters 94 which are focused on those portions of the glass in which the greatest amount of bending occurs and the heat deflector 87 is located to intercept enough of the radiant energy from the heaters 94 and the burner tube 92 to prevent the flat portion of the sheet from reaching bending temperature.

Whichever method is employed the heat deflectors 87 constitute means for shielding or shading a portion of the path of the glass sheet being bent from the radiant energy emitted from a radiant heater or heat source in the heating chamber 3.

It is not necessary that the heat deflector remain stationary within the chamber 3 since similar results may be obtained by mounting a heat deflector 95 from a collapsible framework 96 erected from a portion of a mold frame 97. In this event the heat deflector 95 moves with the mold and glass as the mold structure is carried through the heating chamber 3 and the cooling and tempering system 6. When the mold frame 97 reaches the exit end of the heating chamber 3, the heat deflector 95 engages a stop member or other obstruction which causes the collapsible framework 96 to assume the retracted position shown in Figure 21. In this position the heat deflector 95 and framework 96 are in line with the mold and easily pass through the opening between the baffles 29 and 30 and between the nozzles 18 and 21. The heat deflector 95 which travels with the mold frame 97 is preferable to the stationary deflectors 87 when the area to be shaded occupies only a portion of the length of the glass sheet. The stationary heat deflectors 87 shade a portion of the path of the glass so that the shaded areas traverse and may extend entirely across each glass sheet in the direction of travel of the sheet. The deflector 95, however, moves with the glass and may, therefore, be used to shade any selected portion of the glass regardless of its direction of movement.

The collapsible frame 96 comprises a top member 98, an extension of which carries the heat deflector 95, two sets of parallel links 99 the upper ends of which are attached to the top piece 98 and the lower ends of which are attached to longitudinal bars 100 of the mold frame 97.

Figure 21:
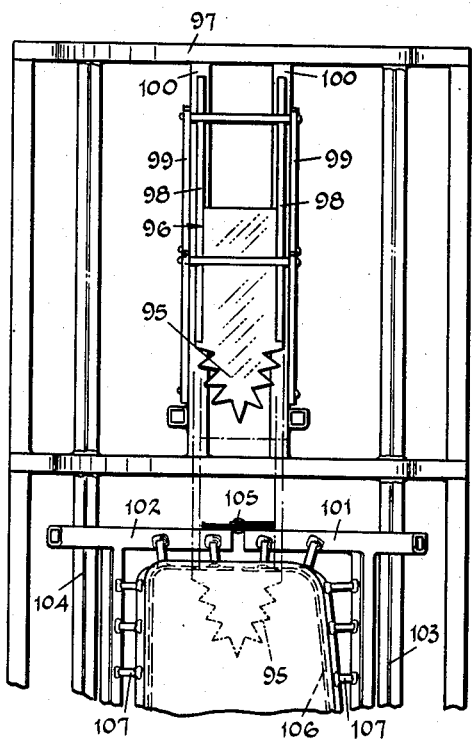
Figure 21 is a plan view of the mold frame and mold showing the heat deflector in its inactive position and indicating its active position.

Figure 21 also shows a fragment of a hinged mold having hinged sections 101 and 102 that are carried on side rails 103 and 104 of the mold frame 97 and that are hinged together by hinges 105 only one of which is shown in the figure. The hinged mold includes a shaping surface 106 which is supported from the hinged sections 101 and 102 by a plurality of short struts 107. In this type of mold the glass is held in transverse compression and, as it softens, it fails as a column and sagging downwardly permits the mold to assume its closed position as the glass settles into contact with the shaping surface 106 which shaping surface conforms to the marginal area of the bent glass sheet. The apparatus shown in Figure 21 is adapted to bend a glass sheet to a shape that approximates a small portion of a conical surface in that the radius of curvature in a transverse direction at one end of the sheet, the end not shown, is quite small while the transverse radius of curvature at the end shown in the figure is quite large. In order to achieve the required curvature at the sharply bent end of the surface, it is necessary to decrease the heat applied to the relatively flat end so that it will not sag out of shape during the bending process. It is to retard the heating at this end of the glass that the heat deflector 95 is brought into a position such that it shades this portion.

Figure 20:
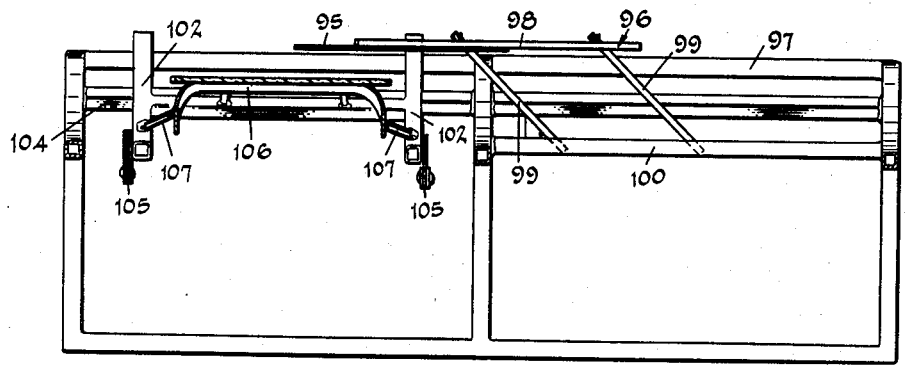
Figure 20 is a vertical section of a mold frame and mold having a heat deflector that is carried on the mold frame.

Since the path of the heat deflector 95 when in the position shown in Figure 20 is below the position of the stationary heat deflectors 87 it is possible to combine the two types of heat deflectors if unusual types of bends must be produced. The efficacy of this method of controlling the heat input to the glass depends upon the fact that a substantial portion of the heat transmitted to the glass is in the form of radiant energy which can be intercepted. The intercepted heat energy raises the temperature of the heat deflectors 95 but this temperature does not rise far enough so that the under surface, the shaded surface, of the heat deflector re-radiates the heat as radiant energy. Thus it is possible to hold the temperature of selected portions of the glass at or below the temperature of the atmosphere within the heating chamber 3 while other portions of the glass that are exposed to the radiant energy are heated to substantially higher temperatures.

Heretofore, in tempering glass sheets or plates, it has been considered necessary to first heat the sheet to be tempered, uniformly over its entire area to substantially the softening point of the glass, and to then suddenly chill the same, uniformly over its entire area, to temper it.

In practicing the present invention, however, both the heating necessary to bending and the preliminary heating step of the tempering procedure is carried on in the chamber 3. Consequently, the glass sheet to be bent tempered is first heated non-uniformly over its area to cause it to bend to the exact curvature desired, and then, after some additional heating of the sheet between the bending portion of the chamber and the discharge end, during which the different temperatures at the various areas of the sheet tend to equalize, the glass is suddenly and uniformly chilled to complete the tempering operation.

It is, of course, important to the obtaining of the desired tempered quality, and proper breaking pattern, that there not be too wide a temperature variation between different areas of the sheet just prior to chilling. However, we have found that some variation in temperature is tolerable, and that satisfactory tempering is obtained under such conditions.

We have also discovered that excellent results can be obtained by applying heat directly to the surfaces only of the sheet to be tempered just before it is chilled. For this purpose, we have in some cases, arranged burners 108 and 109 above and below the path of travel of the sheet, and just inside the exit end of the chamber 3 as shown in Fig. 9, or farther back in the chamber as shown in Fig. 5. These burners are designed for flash heating by playing a blanket of flame upon opposite sides of the sheet passing therebetween, to equalize the surface temperatures of the glass and to allow a higher temperature to be reached at the surface than would otherwise be the case.

This improved apparatus and technique is capable of producing bent glass sheets that conform accurately to predetermined shapes and of tempering the glass sheets without further distortion or handling. The rapid transfer of the glass and its supporting mold from the heated chamber to the quenching region is accomplished automatically by a high speed section of the conveyor without requiring attention from the operator. And finally, the travel through the cooling or quenching zone is accomplished without any stops that would lead to localized cooling of the glass and reduced optical quality. The improved equipment allows the use of the same mold for carrying the glass through the heating chamber and subsequently through the quenching zone without intermediate handling—a feature that is important to the production of high quality bent glass.

Various modifications may be made in the specific details of the apparatus without departing from the spirit and scope of the invention.

Having described the invention, we claim:

1. In a method of bending a sheet of glass in which the glass sheet is supported in bending relation to the shaping surface of a mold and the mold and glass sheet are moved through a high temperature region that includes a source of radiant heat energy with said glass sheet softening and conforming to the shaping surface during travel through the high temperature region, the steps of heating the glass sheet to bending temperature by radiant heat directed toward the sheet from said source, intercepting certain portions of said radiant heat energy that is directed toward the glass sheet during bending thereof with a stationary heat deflector located within said high temperature region and between the source of radiant heat energy and selected areas of the path of the glass by moving the mold and glass sheet relative to said stationary heat deflector to bring selected portions of the glass into position to be shielded by said heat deflector, and subsequently uniformly heating the entire surface of the glass to substantially uniform temperature by moving the mold and glass sheet relative to said stationary heat deflector to bring said sheet out of said shielded position while still in said high temperature region.

2. In a method of bending and tempering a sheet of glass in which the glass sheet is supported in bending relation to the shaping surface of a mold and the mold and glass sheet are moved through a high temperature region that includes a source of radiant heat energy with said glass sheet softening and conforming to the shaping surface during passage through the region, the steps of heating the glass sheet to bending temperature by radiant heat energy directed toward the sheet from said source, intercepting certain portions of the radiant energy that is directed toward the glass during bending thereof, and subsequently heating the entire surface of the glass to substantially uniform temperature while said mold is still in said high temperature region and prior to moving the glass sheet and mold through a cooling and tempering region.

3. In equipment for tempering bent glass sheets, in combination, a lower plenum chamber, a plurality of elongated spaced transverse nozzles directed toward the bent path of the glass sheets and extending upwardly from the plenum chamber into close proximity to said path, said nozzles having long narrow orifices at their outer ends extending from side to side of said bent glass sheets and having their said outer ends curved to substantially conform to the curve of the lower surface of the bent sheet, a conveyor extending along each side of the plenum chamber, and a mold having a shaping surface that contacts narrow marginal areas only of the bent glass sheet for carrying the glass, said mold straddling the nozzles and riding on the conveyors.

4. In equipment for tempering bent glass sheets, in combination, plenum chambers above and below the path of the bent glass sheets to be tempered, a plurality of elongated spaced removable transverse nozzles mounted on each of the chambers and directed toward and into close proximity with the path of the glass, said nozzles having long narrows orifices at their outer ends extending from side to side of said bent glass sheets and having their said outer ends curved to substantially conform to the curve of the bent sheet, conveyors extending along the sides of the lower plenum chamber, and a mold having a shaping surface that contacts narrow marginal areas only of the bent glass sheet that straddles the nozzles of the lower plenum chamber and rides on the conveyors, said conveyors including first sections that are operated at relatively high speed to quickly locate the mold between the nozzles and second sections operated at slow speed for continuing the motion of the mold with relation to the nozzles.

5. In equipment for bending glass sheets, in combination, a heating chamber, a heat source within the chamber, a conveyor for carrying molds bearing glass to be bent through the chamber, a rack extending transversely of the chamber and between the heat source and the path of the glass, and a heat deflector movably mounted on the rack for shielding a selected portion of the path of the glass from radiant heat from the heat source.

6. In equipment for bending glass sheets, in combination, a heating chamber, a heat source within the chamber, a conveyor for carrying molds bearing glass to be bent through the chamber, a rack extending transversely of the chamber and between the heat source and the path of the glass, and a heat deflector that is slidably mounted on the rack and that has a saw toothed edge for minimizing the demarcation between the shaded and unshaded areas, the teeth of the saw toothed edge being symmetrically arranged to mesh with similar teeth of a second heat deflector when larger areas are to be shaded.

7. In equipment for bending glass sheets, in combination, a heating chamber, a heat source in the chamber, a conveyor extending through the chamber, a mold riding on the conveyor and carrying a glass sheet to be bent, a collapsible frame mounted on the mold, and a heat deflector that is mounted on the frame and that in one position of the frame is interposed between a selected portion of the glass and the heat source and that in another position of the frame is completely clear of the glass sheet and any equipment for treating the glass sheet.

8. A method of bending and tempering a sheet of glass that comprises the steps of supporting a sheet of glass in bending relation to a shaping surface of a mold, moving the mold and the glass thereon along a predetermined path, heating selected areas of said glass to higher temperatures than other areas to cause said sheet to bend to accurately fit the shaping surface of the mold, then heating the bent sheet substantially uniformly over its entire area by playing blankets of flame on opposite surfaces thereof, and finally chilling the opposite surfaces also substantially uniformly over their entire areas to temper the glass, all during movement of said mold and glass along said path.

9. In a method of bending and tempering a sheet of glass in which the glass sheet is supported in bending relation to the shaping surface of a mold and the mold and glass sheet are moved through a high temperature region that includes a source of radiant heat energy with said glass sheet softening and conforming to the mold during passage through the region, the steps of shielding selected portions of the glass from the radiant energy during said passage, then ceasing to shield said selected portions and heating the bent sheet substantially uniformly over its entire area by playing blankets of flame on opposite surfaces thereof prior to moving the glass sheet and mold through a cooling and tempering region.

10. In equipment for tempering bent glass sheets, in combination, a lower plenum chamber, a series of elongated spaced transverse nozzles directed toward a path of movement of the bent glass sheets and extending upwardly from said lower plenum chamber into close proximity to said path, said series of nozzles having long narrow orifices at their outer edges and extending from side to side of said bent glass sheets and having their outer ends curved to substantially conform to the curve of the lower surface of the bent sheet, an upper plenum chamber, a series of elongated spaced transverse nozzles directed toward said path of movement of the bent glass sheets and extending downwardly from said upper plenum chamber into close proximity to said path, said second mentioned series of nozzles having long narrow orifices at their outer edges and extending from side to side of said bent glass sheets and having their outer ends curved to substantially conform to the curve of the upper surface of the bent sheet, a conveyor section extending along each side of the plenum chamber, and a mold having a shaping surface that contacts narrow marginal areas only of the bent glass for carrying the same, said mold straddling the nozzles of said first mentioned series and riding on said conveyor sections.

WILLIAM P. BAMFORD.
JOSEPH E. JENDRISAK.
GERALD WHITE.

(References on following page)

References Cited in the file of this patent

UNITED STATES PATENTS

| Number | Name | Date |
|---|---|---|
| 1,483,461 | Littleton | Feb. 12, 1924 |
| 2,003,383 | Miller | June 4, 1935 |
| 2,032,008 | Galey | Feb. 25, 1936 |
| 2,057,763 | Boyles et al. | Oct. 20, 1936 |
| 2,131,873 | Goodwillie | Oct. 4, 1938 |
| 2,140,282 | Drake | Dec. 13, 1938 |
| 2,144,320 | Bailey | Jan. 17, 1939 |
| 2,176,999 | Miller | Oct. 24, 1939 |
| 2,188,401 | Crowley | Jan. 30, 1940 |
| 2,223,123 | Owen | Nov. 26, 1940 |
| 2,223,124 | Owen | Nov. 26, 1940 |
| 2,247,118 | Drake | June 24, 1941 |
| 2,250,628 | Forbes | July 29, 1941 |
| 2,303,749 | Long | Dec. 1, 1942 |
| 2,348,278 | Boyles et al. | May 9, 1944 |
| 2,369,368 | Paddock et al. | Feb. 13, 1945 |
| 2,442,242 | Lewis | May 25, 1948 |
| 2,450,297 | Pearse et al. | Sept. 28, 1948 |
| 2,452,488 | Paddock et al. | Oct. 26, 1948 |

FOREIGN PATENTS

| Number | Country | Date |
|---|---|---|
| 588,007 | Great Britain | May 12, 1947 |